United States Patent [19]

Ragland, Jr.

[11] Patent Number: 4,516,841

[45] Date of Patent: May 14, 1985

[54] METHOD FOR SCREENING LINE SCREEN SLIT MASK COLOR PICTURE TUBES

[75] Inventor: Frank R. Ragland, Jr., Lancaster, Pa.

[73] Assignee: RCA Corporation, Princeton, N.J.

[21] Appl. No.: 524,543

[22] Filed: Aug. 19, 1983

[51] Int. Cl.³ ........................ G03B 41/00; G03C 5/00

[52] U.S. Cl. ........................ 354/1; 430/24

[58] Field of Search ........................ 354/1; 430/24

[56] References Cited

U.S. PATENT DOCUMENTS

| | | | |
|---|---|---|---|
| 2,817,276 | 12/1957 | Epstein et al. | 354/1 |
| 2,936,682 | 5/1960 | Krawitz | 354/1 |
| 3,420,150 | 1/1969 | Kaplan | 354/1 |
| 3,587,417 | 6/1971 | Balder et al. | 354/1 |
| 3,628,429 | 12/1971 | Barten et al. | 354/1 |
| 3,888,673 | 6/1975 | Suzuki et al. | 430/24 |
| 3,889,145 | 6/1975 | Suzuki et al. | 313/408 |
| 3,890,151 | 6/1975 | Suzuki et al. | 430/24 |
| 3,925,700 | 12/1975 | Saito | 313/403 |
| 3,947,718 | 3/1976 | van Lent | 313/408 |
| 3,971,043 | 7/1976 | Suzuki et al. | 354/1 |
| 4,049,451 | 9/1977 | Law | 430/24 |
| 4,078,239 | 3/1978 | Prazak et al. | 354/1 |
| 4,099,848 | 7/1978 | Osakabe | 354/1 |
| 4,135,930 | 1/1979 | Hosokoshi et al. | 354/1 |
| 4,222,642 | 9/1980 | van Nes et al. | 354/1 |
| 4,226,513 | 10/1980 | Shimoma et al. | 354/1 |
| 4,256,390 | 3/1981 | Fischer | 354/1 |
| 4,284,695 | 8/1981 | Fischer | 354/1 |

*Primary Examiner*—A. A. Mathews
*Attorney, Agent, or Firm*—E. M. Whitacre; D. H. Irlbeck; L. L. Hallacher

[57] ABSTRACT

The present invention is an improvement in a method of screening a line screen slit mask color picture tube. Such method includes coating a faceplate panel of the tube with a photosensitive material, inserting a slit shadow mask into the panel and exposing the photosensitive material by passing light from a line light source through the slits of the mask. The improvement comprises positioning a generally cylindrical shaped lens between the line light source and the faceplate panel during exposure of the photosensitive material. The longitudinal axis of the lens is oriented perpendicular to the longitudinal axis of the line light source. Because of the presence of the lens, the images of the line light source projected through the slits of the mask onto the photosensitive material at locations off the major and minor axes of the panel are rotated toward parallelism with the minor axis thereby resulting in exposure of straight smooth lines on the photosensitive material.

7 Claims, 11 Drawing Figures

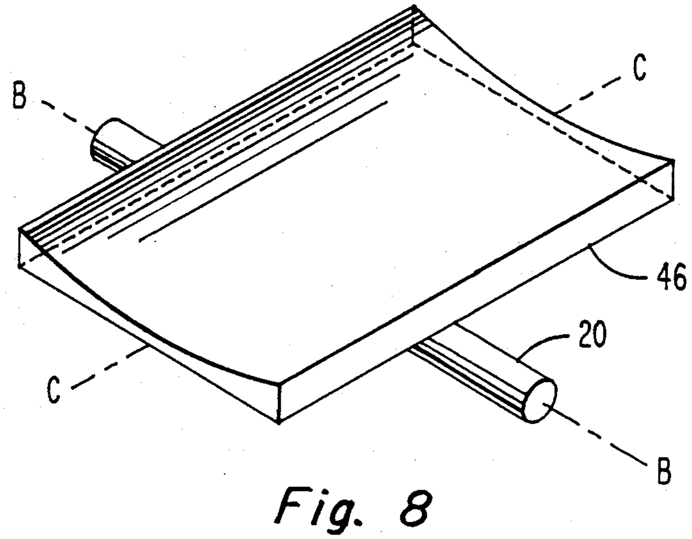
Fig. 8
Fig. 9
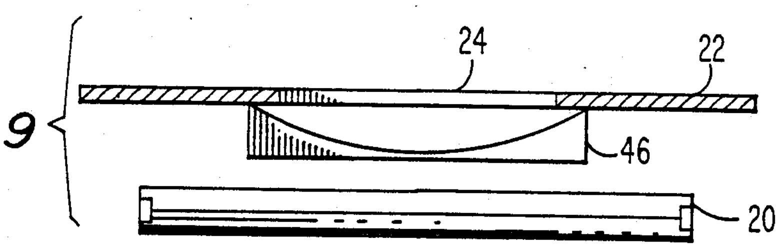

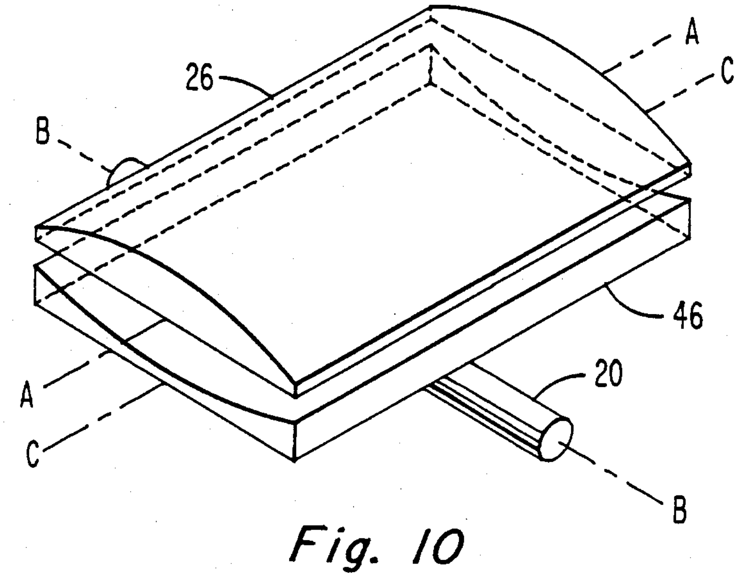
Fig. 10
Fig. 11
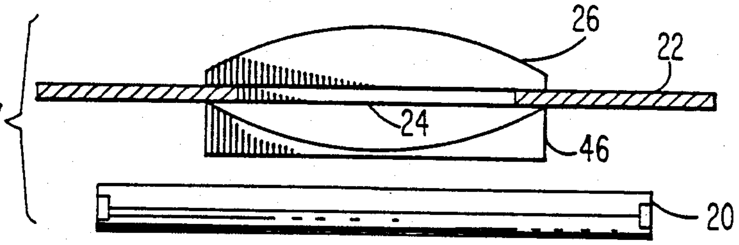

METHOD FOR SCREENING LINE SCREEN SLIT MASK COLOR PICTURE TUBES

This invention relates to a method of screening a color picture tube line screen by a photographic technique that uses a slit shadow mask of the tube as a photomaster, and particularly to such method wherein tilting of a line light source image projected through the shadow mask onto the tube faceplate during screening is corrected by use of a novel correction lens, and the effective length of the line light source is modified by a novel aperture.

Most color picture tubes presently being manufactured are of the line screen slit mask type. These tubes have spherically contoured rectangular faceplates with line screens of cathodoluminescent materials thereon and somewhat spherically contoured slit-apertured shadow masks adjacent to the screens. The mask slits are aligned in parallel vertical columns with each column containing a plurality of slits which are vertically separated by bridge or web portions of the mask. The line screens in these tubes include peripheral borders having slightly curved sides and rounded corners.

Such line screen slit mask type tubes are screened by a photographic method that utilizes a line light source, such as disclosed in U.S. Pat No. 4,049,451 issued to H. B. Law on Sept. 20, 1977. The use of a line light source to form continuous phosphor lines, however, has an inherent problem that must be solved. Because of the substantially spherical curvature of the shadow mask, the slit apertures of the mask, that are off the major and minor axes of the mask, are tilted with respect to the line light source. If uncorrected, such tilting results in the formation of phosphor lines during screening that have relatively ragged sides.

Several methods have been suggested to solve the problem caused by this tilting. One of these methods is disclosed in U.S. Pat. No. 3,888,673, issued to Suzuki et al. on June 10, 1975 and in U.S. Pat. No. 3,890,151, issued to Suzuki et al. on June 17, 1975. In the method of these patents, a shield plate is used in conjunction with a tilting or rocking line light source. As the shield plate is moved to expose various parts of the mask and screen, the light source is tilted so that it parallels the slits in the exposed part of the mask. Such method of screening not only requires several movable mechanical parts, but also is very time consuming since each exposed portion of the screen has to be exposed to the light source a sufficient time to sensitize a photosensitive screen layer.

In another method, the off-minor-axis mask aperture columns are bowed so that the apertures are less tilted with respect to a line light source. Patents illustrative of this concept are: U.S. Pat. No. 3,889,145, issued to Suzuki et al. on June 10, 1975; U.S. Pat. No. 3,925,700, issued to Saito on Dec. 9, 1975; and U.S. Pat. No. 3,947,718 issued to vanLent on Mar. 30, 1976.

In yet another method, a negative meniscus lens is located between a line light source and a shadow mask during screening to cause a rotation of the line light source image in a direction to decrease the aforementioned tilting of the slit image. Such method is disclosed in U.S. Pat. No. 4,078,239, issued to Prazak et al. on Mar. 7, 1979. As noted in this patent, the theoretical limit in reduction of tilting using the meniscus lens disclosed therein appears to be in the approximate range of 62% to 70% depending on tube sizes.

Recently, an improved line screen slit mask color picture tube has been suggested which has a more truly rectangular viewing screen than has previously been achieved in such tubes with spherically curved faceplates. It is particularly important in such improved tubes to form straight smooth phosphor lines on the sides of the screen. Therefore, it is not possible to use the aforementioned bowed apertured column concept to correct for aperture image tilting. Furthermore, although use of the aforementioned meniscus lens concept can provide some correction for aperture image tilt, the theoretical limit to the amount of tilt correction still leaves something to be desired in achieving smooth phosphor lines at the sides of the screen.

SUMMARY OF THE INVENTION

The present invention is an improvement in a method of screening a line screen slit mask color picture tube. Such method includes coating a faceplate panel of the tube with a photosensitive material, inserting a slit shadow mask into the panel and exposing the photosensitive material by passing light from a line light source through the slits of the mask. The improvement comprises positioning a generally cylindrical shaped lens between the line light source and the faceplate panel during exposure of the photosensitive material. The longitudinal axis of the lens is oriented perpendicular to the longitudinal axis of the line light source. Because of the presence of the lens, the images of the line light source projected through the slits of the mask onto the photosensitive material at locations off the major and minor axes of the panel are rotated toward parallelism with the minor axis thereby resulting in exposure of straight smooth lines on the photosensitive material. In an additional improvement, the effective length of the line light source is modified by the use of a barrel-shaped aperture.

BRIEF DESCRIPTION OF THE DRAWINGS

FIG. 8 is a perspective view of another tilt correction lens and a line light source.

FIG. 9 is a partially-sectioned side view of the lens and light source of FIG. 8 with an apertured plate.

FIG. 10 is a perspective view of a combination of two tilt correction lenses and a line light source.

FIG. 11 is a partially-sectioned side view of the lenses and light source of FIG. 10 with an apertured plate between the lenses.

DETAILED DESCRIPTION OF THE PREFERRED EMBODIMENT

Figure 1:
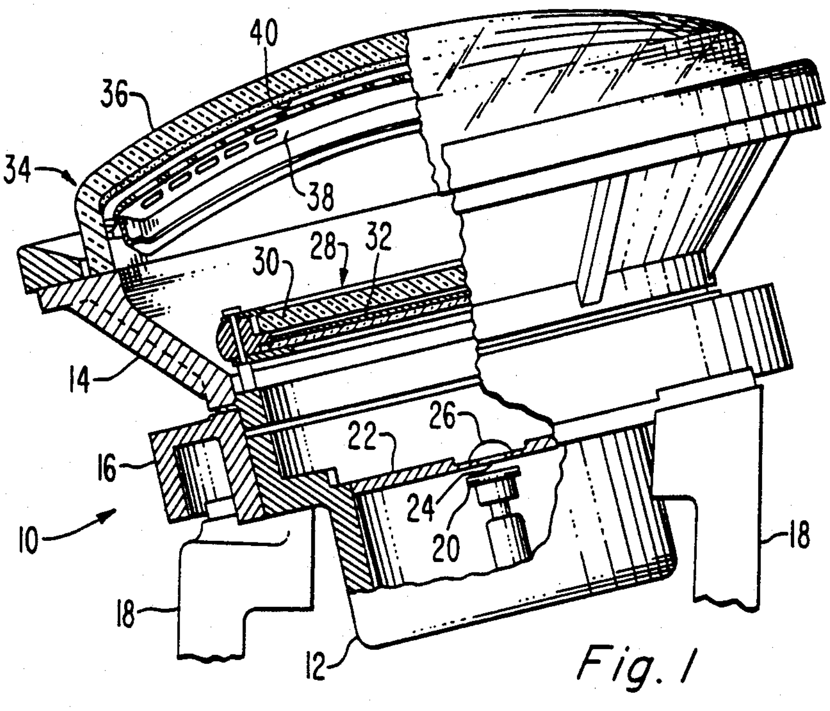
FIG. 1 is a plan view, partly in axial section, of a lighthouse exposure device used for screening color picture tubes.

FIG. 1 shows an exposure device, known as a lighthouse 10, which is used for screening a color picture tube. The lighthouse 10 comprises a light box 12 and panel support 14 held in position by bolts (not shown) with respect to one another on a base 16 which in turn is supported at a desired angle by legs 18. A line light source 20 (typically a mercury arc lamp) is supported within the light box 12. An apertured plate 22 is positioned within the light box 12 above the line light source 20. An aperture 24 within the plate 22 defines the effective length of the line light source 20 that is used during exposure. Just above the aperture 24 is a novel tilt correction lens 26 which will be described in greater detail later. Within the panel support 14 is a main correction lens assembly 28. The lens assembly 28 comprises a misregister correction lens 30, which refracts the light from the light source into paths taken by the electron beams during tube operation, and a light intensity correction filter 32, which compensates for the variations in light intensity in various parts of the lighthouse. A faceplate panel assembly 34 is mounted on the panel support 14. The panel assembly 34 includes a faceplate panel 36 and a slit shadow mask 38 mounted within the panel 36 by known means. The inside surface of the faceplate panel 36 is coated with a photosensitive material 40. During screening, the photosensitive material 40 is exposed by light from the line light source 20 after it passes through the apertured plate 22, the tilt correction lens 26, the filter 32, the misregister correction lens 30 and the shadow mask 38.

Figure 2:
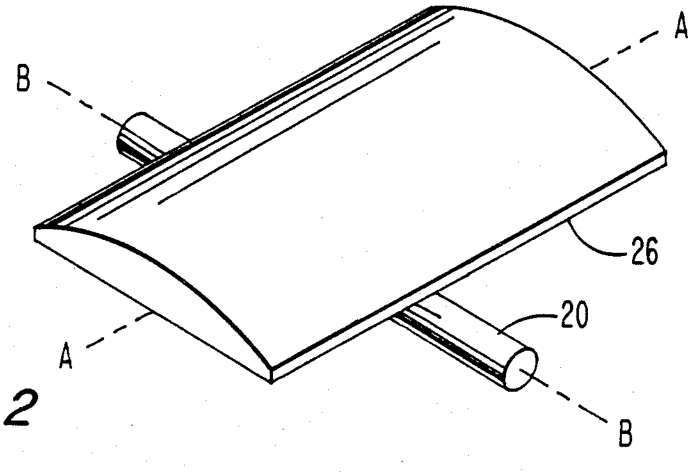
FIG. 2 is a perspective view of a tilt correction lens and a line light source.
Figure 3:
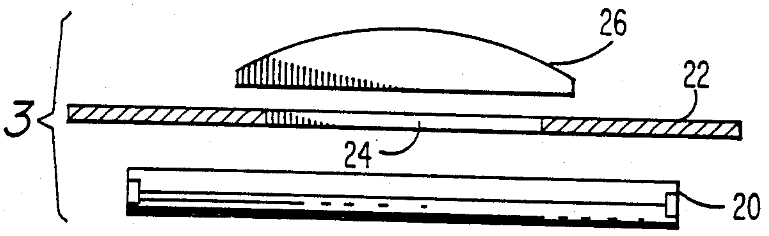
FIG. 3 is a partially sectioned side view of the lens and light source of FIG. 2 with an apertured plate therebetween.

FIGS. 2 and 3 show the line light source 20 and tilt correction lens 26 in greater detail. The lens 26 is generally cylindrically shaped being a solid piece of optical quartz that appears to be a cylinder sliced parallel to its central axis having a generally cylindrical convex surface and a flat surface. The line light source 20 is tubular in shape and may be of the mercury arc type, such as the BH6 lamp manufactured by General Electric. Within the lighthouse 10, the tilt correction lens 26 is oriented with its longitudinal axis A—A perpendicular to the longitudinal axis B—B of the line light source 20. As shown in FIG. 3, the apertured plate 22 is positioned between the light source 20 and the correction lens 26. Although it is possible to place the lens 26 against the plate 22 directly on the aperture 24, it is preferrable to space the lens 26 slightly above the aperture 24.

Figure 4:
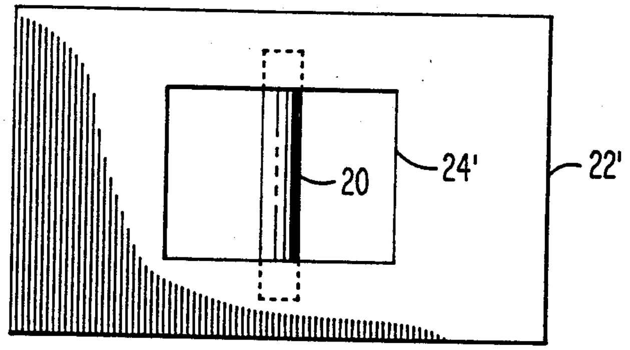
FIGS. 4 and 5 are top views of two embodiments of the apertured plate of FIG. 3.
Figure 5:
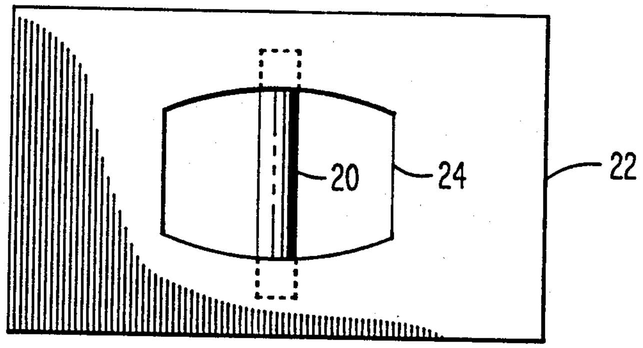

FIG. 4 shows one embodiment of an aperture 24' in a plate 22'. The aperture 24' is rectangular in shape. With this embodiment, the effective length of the light source 20 is constant when viewed at angles with respect to the plate 22'. However, in a preferred embodiment, shown in FIG. 5, the aperture 24 in the plate 22 is barrel-shaped. With this preferred embodiment, the effective length of the light source 20 decreases with increasing angles with respect to the plate 22. Therefore, the sides of a screen are formed with an effective shorter light source than is the central portion of the screen.

Figure 6:
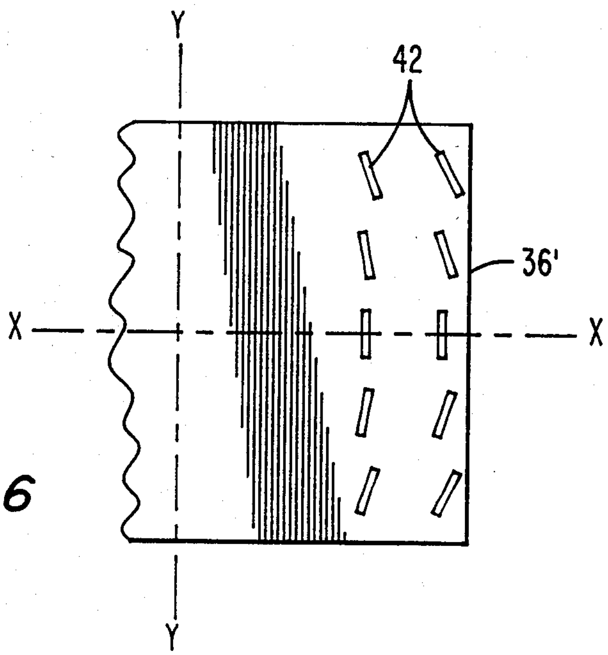
FIG. 6 is a plan view of a faceplate panel showing selected light source images projected thereon wherein the present invention is not used.
Figure 7:
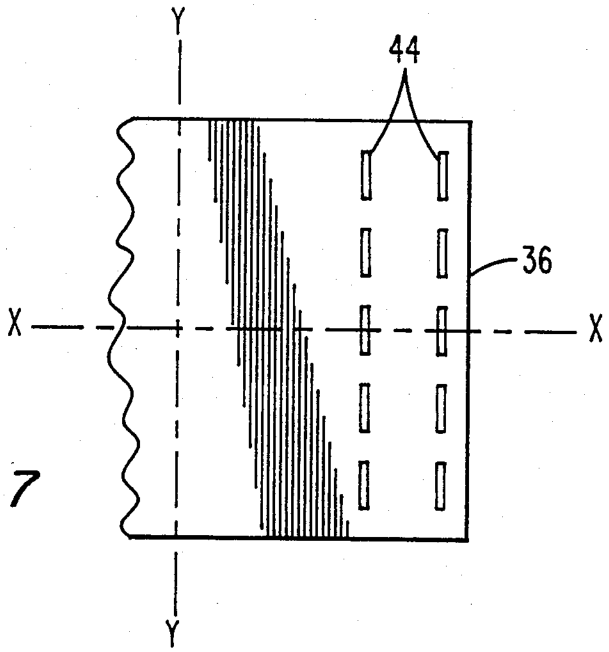
FIG. 7 is a plan view of a faceplate panel showing selected light source images projected thereon using the present invention.

The tilt correction provided by the lens 26 can be seen by comparing FIGS. 6 and 7. FIG. 6 shows the images 42 cast on a faceplate panel 36' of a line light source wherein no tilt correction lens is used. In this figure, the images off the major axis X—X and the minor axis Y—Y are tilted varying angles depending on their distances from both axes. For purposes of illustration, the image sizes and angle of tilt are somewhat exaggerated in this drawing. FIG. 7 shows the light source images 44 cast on the faceplate 36 wherein the tilt correction lens 26 is used during screening. As can be seen, straight smooth lines are screened by using the lens 26.

FIGS. 8 and 9 show another type of generally cylindrical tilt correction lens 46. The upper surface of this lens 46 is concave rather than convex. In the lighthouse, the lens 46 is oriented with its longitudinal axis C—C perpendicular to the longitudinal axis B—B of the line light source 20. However, unlike the previous emmodiment, the concave lens 46 is positioned between the light source 20 and the apertured plate 22, as shown in FIG. 9.

The two foregoing lens embodiments also may be combined as shown in FIGS. 10 and 11. In this combined embodiment, the two lenses 26 and 46 are positioned with their longitudinal axes A—A and C—C, respectively, parallel to each other and perpendicular to the longitudinal axis B—B of the line light source 20.

GENERAL CONSIDERATIONS

The upper surfaces of the lenses described herein are defined as being generally cylindrical. This definition recognizes that such surface can be either truly cylindrical in contour or that the surface can deviate to some extent from the geometric definition of cylindrical. Depending on the specific applications of the present novel method, such deviations may be necessary to fully compensate for light source image tilt in tubes having varying shadow mask contours, varying faceplate panel contours and varying mask-to-screen spacings.

It is preferred that the tilt correction lens used in the present method be an ultraviolet, UV, grade quartz selected for its solarization resistance. Transmission of the lens should exceed 90% after a 100 hour exposure to a 1 KW mercury arc lamp positioned 10 mm components of the slopes of the generally cylindrical from one side of the lens. Furthermore, the X or Y surface of each lens should not deviate more than ±0.5 milliradians from the specified values. The planar surface of each lens should be flat to within 5 uniform fringes using a helium source. Both surfaces of each lens should be finished to an optical polish and clarity with no observable haze.

The following table gives dimensions for a specific circularly cylindrical convex lens of design similar to that of the lens 26 of FIGS. 2 and 3. The quality zone mentioned in the table is the effective area of the lens which is utilized during screening.

TABLE

| | |
|---|---|
| Overall Length | 1.520 inch (38.6 mm) |
| Overall Width | 1.024 inch (26.0 mm) |
| Radius of Curvature | 3.714 inch (94.3 mm) |
| Maximum Thickness | 0.1535 inch (3.9 mm) |
| Length of quality zone | 1.200 inch (30.5 mm) |
| Width of quality zone | 0.924 inch (23.5 mm) |
| Distance from light source centerline to lens plano-surface | 0.415 inch (10.5 mm) |
| Distance from light source centerline to aperture plate | 0.250 inch (6.4 mm) |

What is claimed is:

1. In a method of screening a line screen slit mask color picture tube including coating a faceplate panel of said tube with a photosensitive material, said faceplate panel having a major axis and a minor axis, inserting a slit shadow mask into said panel and exposing said photosensitive material by passing light from a line light source through the slits of said mask, the improvement comprising:

positioning at least one generally cylindrical shaped lens between said line light source and said faceplate panel, during exposure said photosensitive material, with the longitudinal axis of said lens substantially perpendicular to the longitudinal axis of said line light source, whereby the images of said line light source projected through the slits of said mask onto said photosensitive material at locations off said major and minor axes are rotated toward parallelism with said minor axis thereby resulting in exposure of straight smooth lines on said photosensitive material.

2. The method as defined in claim 1, wherein said lens is convex on one side and flat on the opposite side.

3. The method as defined in claim 1, wherein said lens is concave on one side and flat on the opposite side.

4. The method as defined in claim 1, including a plate located between said line light source and said faceplate panel, said plate including an aperture for defining the effective length of said line light source.

5. The method as defined in claim 4, wherein the aperture in said plate is barrel-shaped with the curved sides of said aperture being transverse to the longitudinal axis of said line light source.

6. The method as defined in claim 4, including two generally cylindrical lenses, one of said lenses having a convex surface and being located between said plate and said panel and the other of said lenses having a concave surface and being located between said line light source and said plate.

7. In a method of screening a line screen slit mask color picture tube including coating a faceplate panel of said tube with a photosensitive material, inserting a slit shadow mask into said panel and exposing said photosensitive material by passing light from a line light source through the slits of said mask, the improvement comrising:

positioning at least one generally cylindrically shaped lens between said line light source and said faceplate panel during exposure of said photosensitive material, the longitudinal axis of said lens being substantially perpendicular to the longitudinal axis of said line light source, and locating a plate between said line light source and said faceplate panel, said plate including an aperture for defining the effective length of said line light source, said aperture having at least two outwardly curving sides arranged substantially transverse to the longitudinal axis of said line light source, whereby the effective length of the projection of said line light source onto said faceplate panel is shorter at the sides of said panel than at the center of said panel.

* * * * *

UNITED STATES PATENT AND TRADEMARK OFFICE

CERTIFICATE OF CORRECTION

PATENT NO. : 4,516,841

DATED : May 14, 1985

INVENTOR(S) : Frank Rowland Ragland, Jr.

It is certified that error appears in the above-identified patent and that said Letters Patent is hereby corrected as shown below:

Col. 4, line 39, cancel "compo-"

Col. 4, line 40, cancel "nents of the slopes of the generally cylindrical"

Col. 4, line 41, after "Y" insert -- components of the slopes of the generally cylindrical --

Signed and Sealed this

*Twenty-sixth* Day of *November 1985*

[SEAL]

*Attest:*

DONALD J. QUIGG

*Attesting Officer* *Commissioner of Patents and Trademarks*